H. LEMP.
STEERING DEVICE FOR AUTOMOBILES.
APPLICATION FILED NOV. 9, 1905.

1,020,707.

Patented Mar. 19, 1912.

4 SHEETS—SHEET 2.

Witnesses:

Inventor,
Hermann Lemp,
By
Att'y.

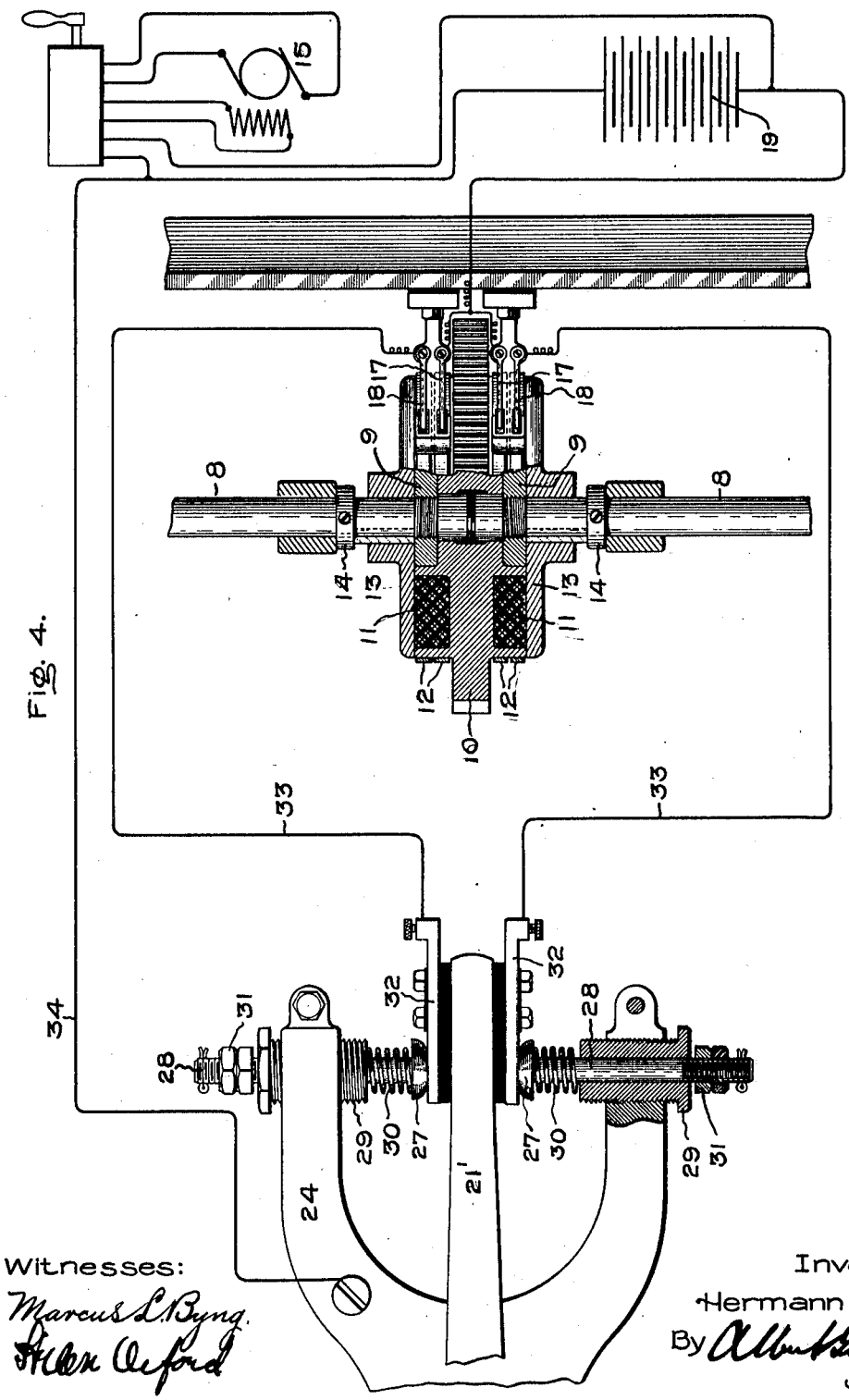

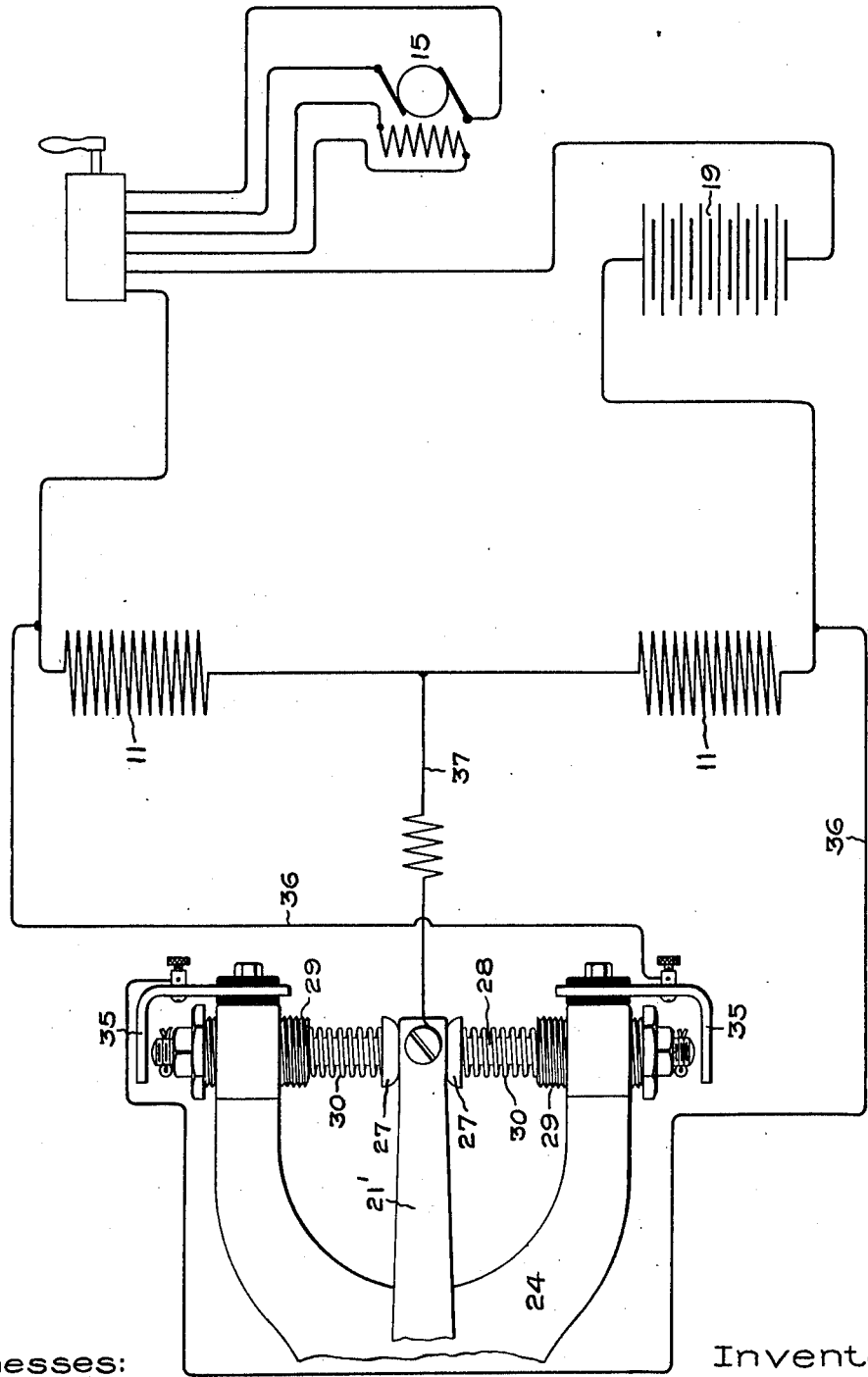

UNITED STATES PATENT OFFICE.

HERMANN LEMP, OF LYNN, MASSACHUSETTS, ASSIGNOR TO GENERAL ELECTRIC COMPANY, A CORPORATION OF NEW YORK.

STEERING DEVICE FOR AUTOMOBILES.

1,020,707. Specification of Letters Patent. Patented Mar. 19, 1912.

Application filed November 9, 1905. Serial No. 286,489.

*To all whom it may concern:*

Be it known that I, HERMANN LEMP, a citizen of the United States, residing at Lynn, county of Essex, and State of Massachusetts, have invented certain new and useful Improvements in Steering Devices for Automobiles.

This invention relates to self-propelled vehicles, and its main object is to avoid the use of a differential gearing for connecting the two driving shafts, and yet permit the driving wheels to operate independently in turning a curve.

Another object is to render the steering of the automobile easier, and make it more responsive to the movements of the steering handle.

With these ends in view, the invention consists of the combination with an automobile having a single motor, and two independent driving wheels, of two electro-magnetic clutches for connecting said motor to the driving wheels, and steering mechanism provided with switches controlling the circuits of said clutches. When it is desired to deflect the vehicle from a straight course, the steering handle is moved in the desired direction, and in performing this operation one or the other of the clutches is cut out or short circuited, so that one of the driving wheels is disconnected from the motor until the automobile is brought back to a tangential course.

Figure 1:
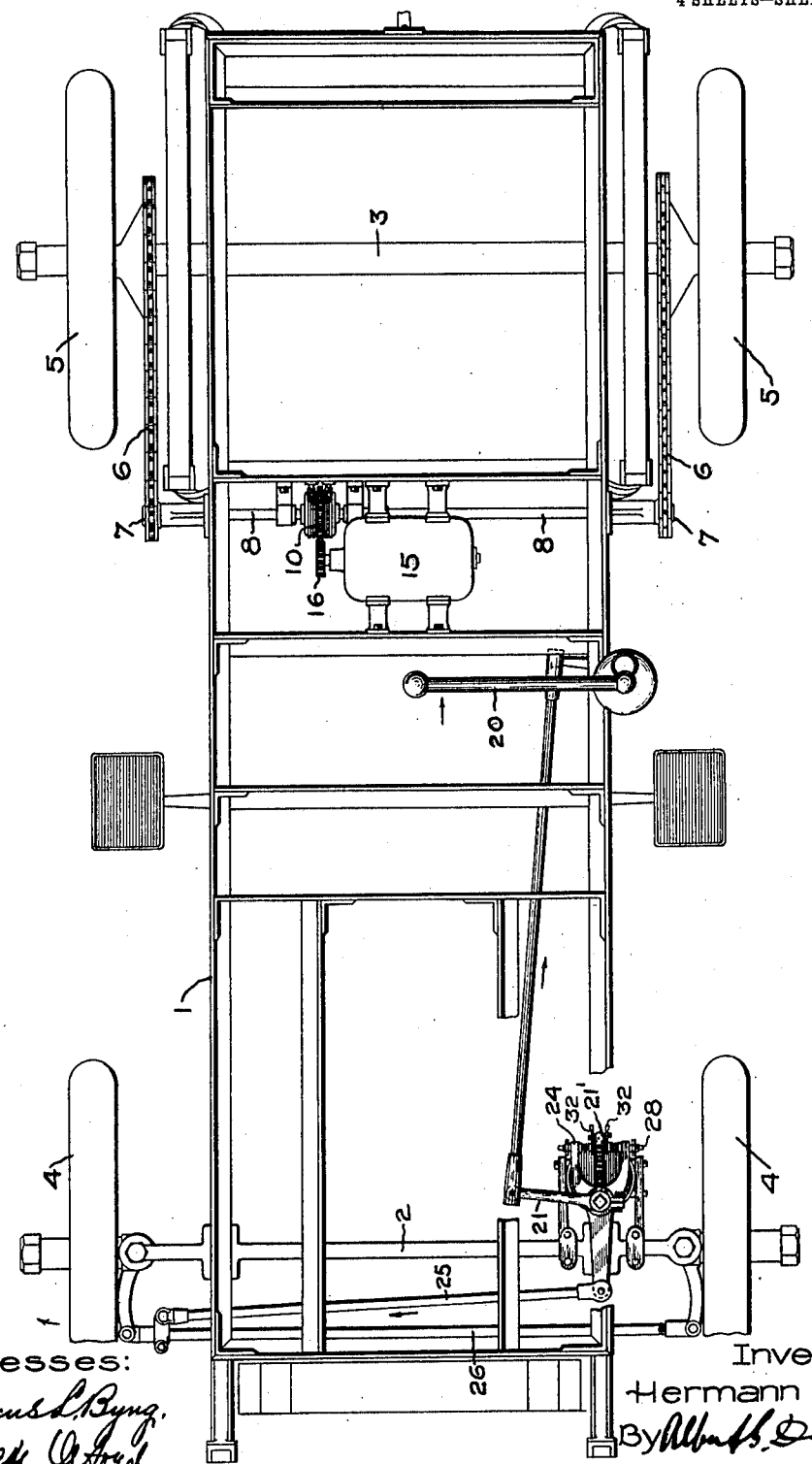
Figure 2:
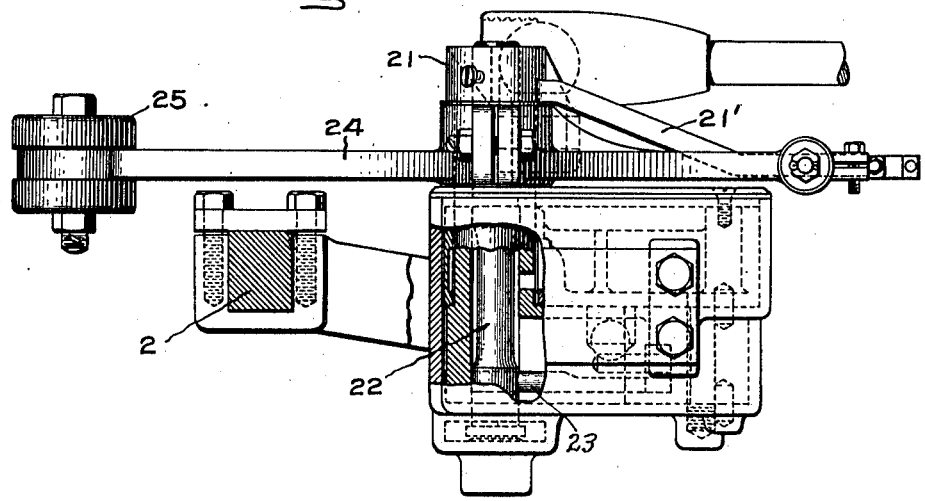
Figure 3:
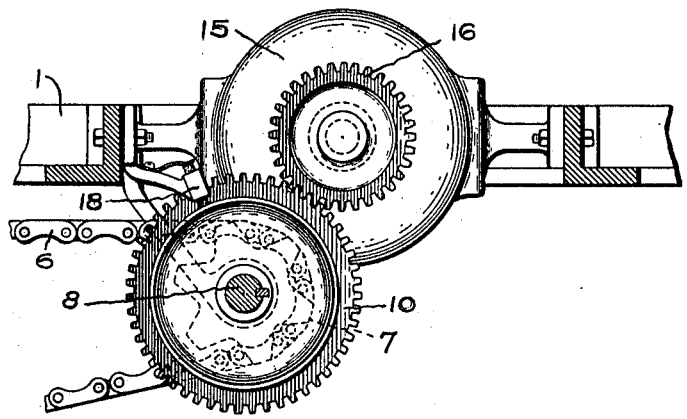

In the accompanying drawings, Figure 1 is a plan view of a chassis embodying my invention; Fig. 2 is a side elevation of the steering check; Fig. 3 is a side elevation of the motor and clutch; Fig. 4 is a diagram of circuits and connections; and Fig. 5 is a diagram of a modification.

The frame 1 is suitably supported on the axles 2, 3, on which are the steering wheels 4 and the driving wheels 5. Each driving wheel has its own sprocket chain 6 running over a sprocket pinion 7 on a counter-shaft 8. The two shafts 8 are in axial alinement with their ends adjacent and near said ends are nuts 9 between which is mounted the spur-gear 10, running loose on both shafts. In order to couple this gear to one or both shafts, electro-magnetic clutches are provided. The preferred construction of the clutches is the one illustrated, wherein an annular groove is formed in each side of the spur-gear 10 to receive the annular coil 11 of insulated wire, whose terminals are connected to two insulated collector rings 12 mounted on the outside of said gear. A disk 13 is splined on each counter-shaft and serves as an armature for the annular magnet constituted by the adjacent side of the gear and its embedded coil. The armatures have a slight longitudinal play on the shafts between the gear and the stationary collars 14. The armatures and coils thus constitute electro-magnetic clutches for connecting the gear 10 with the shafts 8.

The motor 15 is secured to the frame, and has on its armature shaft a pinion 16 meshing with the spur-gear 10. Insulated brushes 17 18 rub on the collector rings, and a source of electric energy, such as a battery 19, has one terminal connected with the brushes 17. The brushes 18 are connected with the other terminal of the battery by separate circuits each controlled by a switch which is operatively connected with the steering mechanism. The steering handle 20 is suitably connected with a lever 21 which operates the steering wheels and opens and closes the aforesaid switches. I prefer to utilize at this point a steering check of the kind shown in my Patent, No. 725,457, dated April 14, 1903, as illustrated in Figs. 1 and 2. The lever 21 is a bell-crank or elbow lever, and is secured to the upright spindle 22 which controls the valves in the piston 23. A bifurcated lever 24 is secured to the hub of the piston and is connected by a link 25 with the parallel-motion bar 26 that moves the steering-wheels 4. The arm 21' of the bell-crank lever lies between the arms of the forked lever 24 and can impart movement thereto through suitable spring buffers. Each buffer preferably has a head 27, a shank 28 sliding through a bushing 29 screwed into a tapped hole in the arm of the lever 24, a spring 30 encircling the shank and abutting between the head 27 and the inner end of the bushing, and check-nuts 31 on the outer end of the shank to limit the inward movement thereof. The heads of the buffers are pressed by the springs against contact plates 32 secured to the sides of the arm 21' and insulated therefrom. Each plate is connected by a wire 33 with its respective brush 18, and the lever 24 is connected by a wire 34 with the battery 19.

The operation is as follows: When running on a straight course, both buffers bear on the contact-plates 32 and the circuit of the battery is closed through both of the electro-magnetic clutches, so that the motor operates both driving-wheels. Now if the operator moves the steering handle to turn the machine in another direction, the lost motion in the steering check permits the arm or controlling finger 21' to move away from one of the buffers and break the circuit of the clutch controlled thereby, the buffer being prevented by its check-nuts from following the finger. This leaves the corresponding counter-shaft and driving-wheel disconnected from the motor, and it will be seen that the arrangement is such that it is the inside wheel that is thus caused to run free; the driving being done by the outside wheel.

In Fig. 5 the buffers serve as circuit-closers, one or the other, as the case may be, being forced by the finger 21' against an insulated contact-piece 35 secured to the arm of the fork adjacent to said buffer, and connected by a wire 36 with one terminal of a clutch coil. The finger 21' is itself connected by a wire 37 with the other terminal of both coils, which are in series with each other and the battery. Under normal conditions, current from the battery energizes both coils. When the controlling finger is moved, it pushes the corresponding buffer against the adjacent contact-piece and short-circuits the coil connected therewith; thereby deënergizing that clutch.

I have shown the automobile driven by an electric motor, but it is evident that any other type of motor could be substituted therefor.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In an automobile, the combination with two independent driving wheels, of a motor for operating them, electromagnetic clutches for connecting the motor with the driving wheels, steering mechanism including two levers movable about a common center and having a limited movement relative to each other, and devices for controlling the clutches that are carried by the levers and actuated by said relative movement when the steering mechanism is operated.

2. In an automobile, the combination with two independent driving wheels, of a motor for operating them, electro-magnetic clutches for connecting the motor with the respective driving wheels, a switch controlling each clutch circuit, and steering mechanism including two levers movable about a common center which controls both switches, there being a lost motion connection between said levers.

3. In an automobile, the combination with two independent driving wheels, of a motor for operating them, electro-magnetic clutches for connecting the motor with the respective driving wheels, a switch controlling each clutch circuit, and steering mechanism including two levers movable relatively to each other about a common center, which by their relative movement open and close said switches alternately as said mechanism is operated to direct the automobile toward one side or the other of a straight course.

4. In an automobile, the combination with two independent driving wheels, of a motor for operating them, electro-magnetic clutches for connecting the motor with the respective driving wheels, steering mechanism comprising two levers having a limited movement relative to each other about a common center, and switches controlling said clutches and operated by the relative movement of the levers.

5. In an automobile, the combination with two independent driving wheels, of a motor for operating them, electro-magnetic clutches for connecting the motor with the respective driving wheels, steering mechanism comprising a steering check having two levers, one lever having a bifurcated end between the forks of which an arm of the other lever moves, and coöperating contacts on said levers controlling the clutches.

6. The combination with a steering check having a bifurcated lever, a lever movable between the arms of the fork, and spring buffers in said arms, of insulated contact-plates on one of said levers, and electro-magnetic clutches in circuit with the levers and contact-plates.

7. In an automobile, the combination with the driving and steering wheels, two alined shafts connected to the driving wheels, a spur gear loosely journaled on the abutting ends thereof, armatures splined on the said shafts and arranged to move axially, solenoid coils for causing the armatures to grip the sides of the gear, a source of current for energizing the coils, and a steering mechanism for the steering wheels that also controls the action of the coils.

8. In an automobile, the combination with two independent driving wheels, of a motor for operating them, electro-magnetic clutches for connecting the motor with the respective driving wheels, steering mechanism including a steering check provided with two members having a lost motion connection between them which permits a limited relative movement of said members, and switches controlling said clutches which are operated by said members as they move relatively to each other.

9. In an automobile, the combination with two independent driving wheels, of a motor for operating them, electro-magnetic clutches for connecting the motor with the respective driving wheels, a steering mechanism including a steering check and two levers movable about a common center, there being a lost motion connection between the two levers which permits a limited relative movement of said levers to control the operation of the check, and switches in the clutch circuits which are operated by said levers as they move relatively to each other.

In witness whereof, I have hereunto set my hand this sixth day of November, 1905.

HERMANN LEMP.

Witnesses:
JOHN A. MCMANUS, Jr.,
HENRY O. WESTENDARP.

Copies of this patent may be obtained for five cents each, by addressing the "Commissioner of Patents, Washington, D. C."